(12) United States Patent
Renard et al.

(10) Patent No.: US 10,761,705 B2
(45) Date of Patent: *Sep. 1, 2020

(54) SETTING A PARAMETER

(71) Applicant: DASSAULT SYSTEMES, Velizy Villacoublay (FR)

(72) Inventors: Amelie Renard, Issy-les-Moulineaux (FR); Laura Peythieux, Boulogne Billancourt (FR); Frederic Letzelter, Longjumeau (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 60 days.

This patent is subject to a terminal disclaimer.

(21) Appl. No.: 14/982,984

(22) Filed: Dec. 29, 2015

(65) Prior Publication Data

US 2016/0188192 A1 Jun. 30, 2016

(30) Foreign Application Priority Data

Dec. 29, 2014 (EP) ..................................... 14307201

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *G06F 3/04842* (2013.01); *G06F 3/04845* (2013.01); *G06F 3/04883* (2013.01)

(58) Field of Classification Search
CPC ......................................... G06F 3/0481–0489
See application file for complete search history.

(56) References Cited

U.S. PATENT DOCUMENTS 5,689,667 A * 11/1997 Kurtenbach .......... G06F 3/0482
715/810
5,798,760 A * 8/1998 Vayda ................... G06F 3/0482
715/834
(Continued)

FOREIGN PATENT DOCUMENTS

CN 101566910 A 10/2009
EP 2083350 A2 7/2009
(Continued)

OTHER PUBLICATIONS

Extended European Search Report dated Jul. 16, 2015 in European Patent Application No. 14307201.5.
(Continued)

*Primary Examiner* — Steven B Theriault
(74) *Attorney, Agent, or Firm* — Oblon, McClelland, Maier & Neustadt, L.L.P.

(57) ABSTRACT

A computer-implemented method of setting a parameter. The method comprises detecting a user input on a first location on a graphical user interface, the user input being maintained. The method also comprises displaying on the graphical user interface a pie menu centered on the first location, the pie menu comprising at least one angular sector that is associated with a customizable parameter, detecting a second location of the user input on the graphical user interface in the at least angular sector, and selecting among a set of values, a value of the customizable parameter according to the detected second location.

14 Claims, 4 Drawing Sheets

(51) Int. Cl.
*G06F 3/0482* (2013.01)
*G06F 3/0488* (2013.01)

(56) References Cited

U.S. PATENT DOCUMENTS

| | | | | |
|---|---|---|---|---|
| 6,414,700 | B1* | 7/2002 | Kurtenbach | G06F 3/0482 715/810 |
| 7,080,324 | B1* | 7/2006 | Nelson | G06F 3/04847 715/771 |
| 7,555,726 | B2* | 6/2009 | Kurtenbach | G06F 3/0482 715/810 |
| 7,932,909 | B2* | 4/2011 | Niles | G06F 3/04815 345/419 |
| 8,250,488 | B2* | 8/2012 | Szoczei | G06F 3/0481 715/833 |
| 8,402,391 | B1* | 3/2013 | Doray | G06F 3/0482 715/834 |
| 8,832,597 | B2* | 9/2014 | Kurtenbach | G06F 3/0482 715/810 |
| 8,910,078 | B2* | 12/2014 | Sweeney | G06F 3/0481 715/800 |
| 9,098,180 | B1* | 8/2015 | Craig | G06F 3/04847 |
| 9,195,368 | B2* | 11/2015 | Kuscher | G06F 3/0482 |
| 9,594,493 | B2* | 3/2017 | Otero Diaz | G06F 3/0482 |
| 9,747,014 | B2* | 8/2017 | Tarvainen | G06F 3/04847 |
| 9,772,759 | B2* | 9/2017 | Hogan | G06F 3/0488 |
| 2001/0011995 | A1* | 8/2001 | Hinckley | A63F 13/06 345/156 |
| 2002/0063737 | A1* | 5/2002 | Feig | G06F 3/04847 715/786 |
| 2007/0180392 | A1* | 8/2007 | Russo | G06F 3/0482 715/765 |
| 2008/0186808 | A1* | 8/2008 | Lee | G04G 5/04 368/10 |
| 2008/0229245 | A1* | 9/2008 | Ulerich | G06F 3/0482 715/834 |
| 2009/0037813 | A1* | 2/2009 | Newman | G06F 3/0482 715/702 |
| 2009/0043195 | A1* | 2/2009 | Poland | A61B 8/00 600/437 |
| 2009/0187860 | A1* | 7/2009 | Fleck | G06F 3/0482 715/834 |
| 2010/0182247 | A1* | 7/2010 | Petschnigg | G06F 1/1647 345/173 |
| 2010/0185983 | A1* | 7/2010 | Szoczei | G06F 3/0481 715/833 |
| 2010/0192103 | A1* | 7/2010 | Cragun | G06F 3/04817 715/834 |
| 2010/0205532 | A1* | 8/2010 | Adhikari | G06F 3/04817 715/727 |
| 2011/0055760 | A1* | 3/2011 | Drayton | G06F 3/0482 715/834 |
| 2011/0255081 | A1* | 10/2011 | De Greeve | G01N 21/8901 356/237.2 |
| 2012/0030626 | A1* | 2/2012 | Hopkins | G06F 3/04847 715/833 |
| 2012/0036434 | A1* | 2/2012 | Oberstein | G06F 3/0482 715/702 |
| 2012/0144345 | A1* | 6/2012 | Munter | G06F 3/04883 715/863 |
| 2013/0019173 | A1* | 1/2013 | Kotler | G06F 3/0482 715/711 |
| 2013/0019205 | A1* | 1/2013 | Gil | G06F 3/04812 715/834 |
| 2013/0127911 | A1* | 5/2013 | Brown | G06F 3/04886 345/649 |
| 2013/0173445 | A1* | 7/2013 | Johnson | G06Q 40/04 705/37 |
| 2014/0075388 | A1* | 3/2014 | Kuscher | G06F 3/0482 715/834 |
| 2014/0214495 | A1* | 7/2014 | Kutty | G06Q 10/0637 705/7.36 |
| 2014/0245226 | A1* | 8/2014 | Butscher | G06F 3/0483 715/834 |
| 2014/0313135 | A1* | 10/2014 | Pisters | G06F 3/0484 345/173 |
| 2014/0351732 | A1 | 11/2014 | Nasraoui et al. | |
| 2014/0351752 | A1* | 11/2014 | Wu | G06F 3/04817 715/810 |
| 2014/0359508 | A1* | 12/2014 | Otero Diaz | G06F 3/0482 715/771 |
| 2017/0097746 | A1* | 4/2017 | Doray | G06F 3/0482 |

FOREIGN PATENT DOCUMENTS

| | | |
|---|---|---|
| JP | 2002-7023 | 1/2002 |
| JP | 2003-108286 | 4/2003 |
| JP | 2009-266203 | 11/2009 |
| JP | 2014-191612 | 10/2014 |

OTHER PUBLICATIONS

Extended European Search Report dated Jul. 16, 2015 in European Patent Application No. 14307199.1.
Extended European Search Report dated Jul. 16, 2015 in European Patent Application No. 14307200.7.
Office Action dated Apr. 4, 2019, in Europe Patent Application No. 14 307 201.5-1216. (8 pgs.).
Office Action dated Dec. 10, 2019 in Japanese Patent Application No. 2015-248575 (with English translation), 6 pgs.
Office Action dated Nov. 12, 2019 in Japan Patent Application No. 2015-248555 (with English-language translation), 8 pgs.
Office Action dated Nov. 12, 2019 in Japan Patent Application No. 2015-248590 (with English-language translation), 8 pgs.
Office Action dated Nov. 22, 2019 in China Patent Application No. 201510998359.7 (with English translation).
Office Action dated Nov. 22, 2019 in China Patent Application No. 201511000372.5 (with English translation).

* cited by examiner

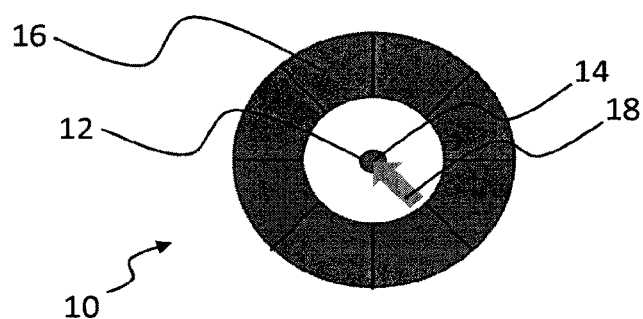
FIG. 1
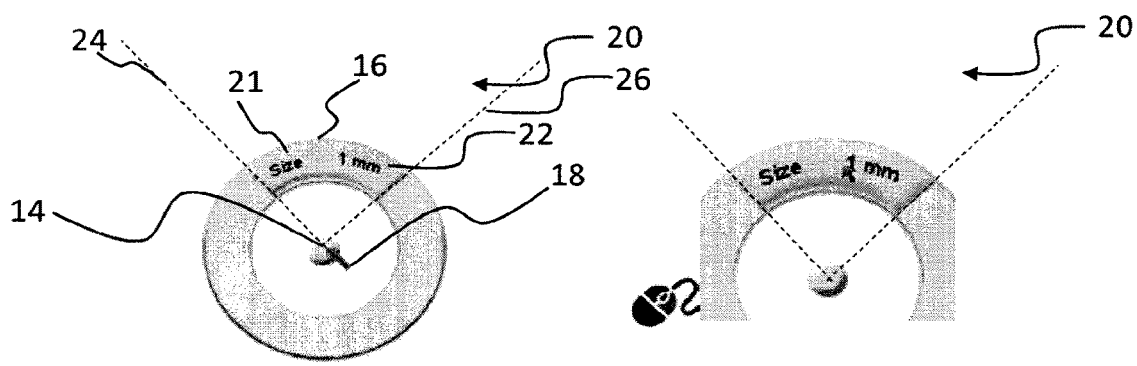
FIG. 2          FIG. 3
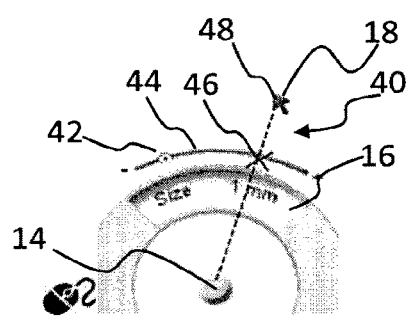   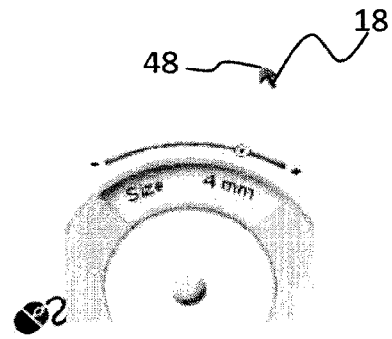   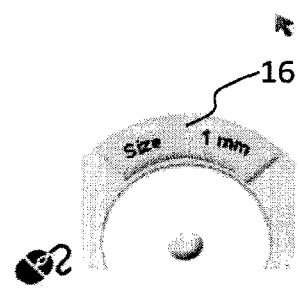
FIG. 4          FIG. 5          FIG. 6

SETTING A PARAMETER

CROSS-REFERENCE TO RELATED APPLICATIONS

This application claims priority under 35 U.S.C. § 119 or 365 to European Application No. 14307201.5, filed Dec. 29, 2014. The entire teachings of the above application(s) are incorporated herein by reference.

FIELD OF THE INVENTION

The invention relates to the field of computer programs and systems, and more specifically to a method, system and program for setting a parameter.

BACKGROUND

Pie menus are widely used in graphical user interface for performing the selection of an action or for triggering a function. Pie menus are also referred to as radial menus because the menu items are displayed in a substantially circular arrangement around a center point. Each of the menu items, in addition to the icon or text representing the item, has a selectable area that is a pie menu sector, i.e. a sector of the entire pie menu. Pie menus are commonly implemented with a pie menu activation input that starts their operation. Subsequent input may then be interpreted as a pie menu selection input, i.e. an input that selects one of the pie menu sectors. Once a pie menu sector has been selected, usually the action associated with the pie menu item assigned to that sector is executed. The action associated with the pie menu item can be the selection of one value associated with the item, or it can be the triggering of a function, for instance adding texture on a 3D modeled object.

Pie menus suffers several drawbacks. The first one is that user interactions that are not pointer-based can be problematic. Notably, touch screens are problematic because the appendage (e.g. a finger) in contact with the touch screen performs both the position of the user interaction and the user user interaction.

The second drawback is that the selection accuracy in a pie menu is related to the number of items the menu offers. Higher numbers of menu items require more angular precision for selection. For that reason, a pie menu involves a trade-off between the number of menu items and the ease of selection from the menu. This is more particularly an issue in contexts of selection of continuous values (within a range); for instance, the size of a pie menu is limited in order to keep the user working area clear.

A solution to problem is to implement a pie menu wherein each menu item leads to sub-menu items, themselves leading to sub-menus item until the user finds the value he is loocking for. However, this kind of solution is not satisfactory as the successive selections of a menu item go against the principles of operation of a pie menu: a faster and more reliable selection that depends on the distance between the cursor and the menus item, a large menu slices in size and near the pointer for fast interaction, use selection without looking at the menu while performing a selection.

Within this context, there is still a need for an improved method for setting in a pie menu the value of a parameter that is selected among a range of continuous values.

SUMMARY OF THE INVENTION

It is therefore provided a computer-implemented method of setting a parameter. The method comprises detecting a user input on a first location on a graphical user interface, the user input being maintained; displaying on the graphical user interface a pie menu centered on the first location, the pie menu comprising at least one angular sector that is associated with a customizable parameter; detecting a second location of the user input on the graphical user interface in the at least angular sector; and selecting, among a set of values, a value of the customizable parameter according to the detected second location.

The method may further comprise:
- the set of values is represented by an object in the at least one angular sector, the selecting step comprising: identifying an intersection point between the object and a segment that extends between the first and second locations; selecting a value associated to the intersection point as the value of the customizable parameter;
- after the step of detecting the second location: activating the at least one angular sector; displaying at least one handle on the object in the at least one angular sector as a result of the activation of the angular zone; and further comprising after the step of selecting: positioning the at least one handle in the at least one angular sector at the intersection point;
- the step of displaying the at least one handle further comprises displaying the at least one handle at a first position that is defined by a former value of the parameter; and wherein the step of positioning the at least one handle comprises moving (S80) the at least one handle in the at least one angular sector from the first position to the intersection point;
- the movement of the at least one handle from the first position to the intersection point follows the object that is a line, the at least one handle and the line forming a slider;
- the at least one handle is selected among a set of handles, the selection being carried out according a distance between the second location and the first location;
- after the step of selecting: selecting, among the set of values, a second value of the customizable parameter that replaces the value previously selected by displacing the user input from the second location to a third location;
- the selection of the second value among the set of values is performed by: traversing ranked values of the set from the previously selected value of the parameter, the number of ranked values traversed being proportional to a distance of the displacement of the user input from the second location to the third location; selecting, as the value of the customizable parameter, the last value met during the traversal when the third location is reached;
- a step of positioning the at least one handle according to the selected second value by moving the at least one handle from the intersection point to a second position that is obtained according to the third location;
- the displacement from the second location to a third location is substantially perpendicular to a bisection of the at least one angular sector;
- the number of ranked values traversed is further proportional to a second distance between the second location and the first location;
- displaying in real time the value currently met while traversing the ranked values;
- releasing the user input thereby validating the selected value of the customizable parameter and removing the pie menu displayed on the graphical user interface.

It is also provided a widget comprising code means for performing the above method, wherein the pie menu displayed on the graphical user interface comprises an annulus with at least one annular sector delimited the at least one angular sector, and wherein the at least one annular sector displays the selected value of the customizable parameter.

It is also provided a system comprising a processor communicatively coupled to a memory and a display, the memory having recorded thereon instruction causing the processor to execute the above method.

It is further provided a computer program comprising instructions for performing the above method.

It is further provided a computer readable storage medium having recorded thereon the computer program.

BRIEF DESCRIPTION OF THE DRAWINGS

Embodiments of the invention will now be described, by way of non-limiting example, and in reference to the accompanying drawings, where:

FIGS. 1 and 2 show examples of pie menus;
FIGS. 3 to 6 show an example of the present invention.

DETAILED DESCRIPTION OF THE INVENTION

Figure 7:
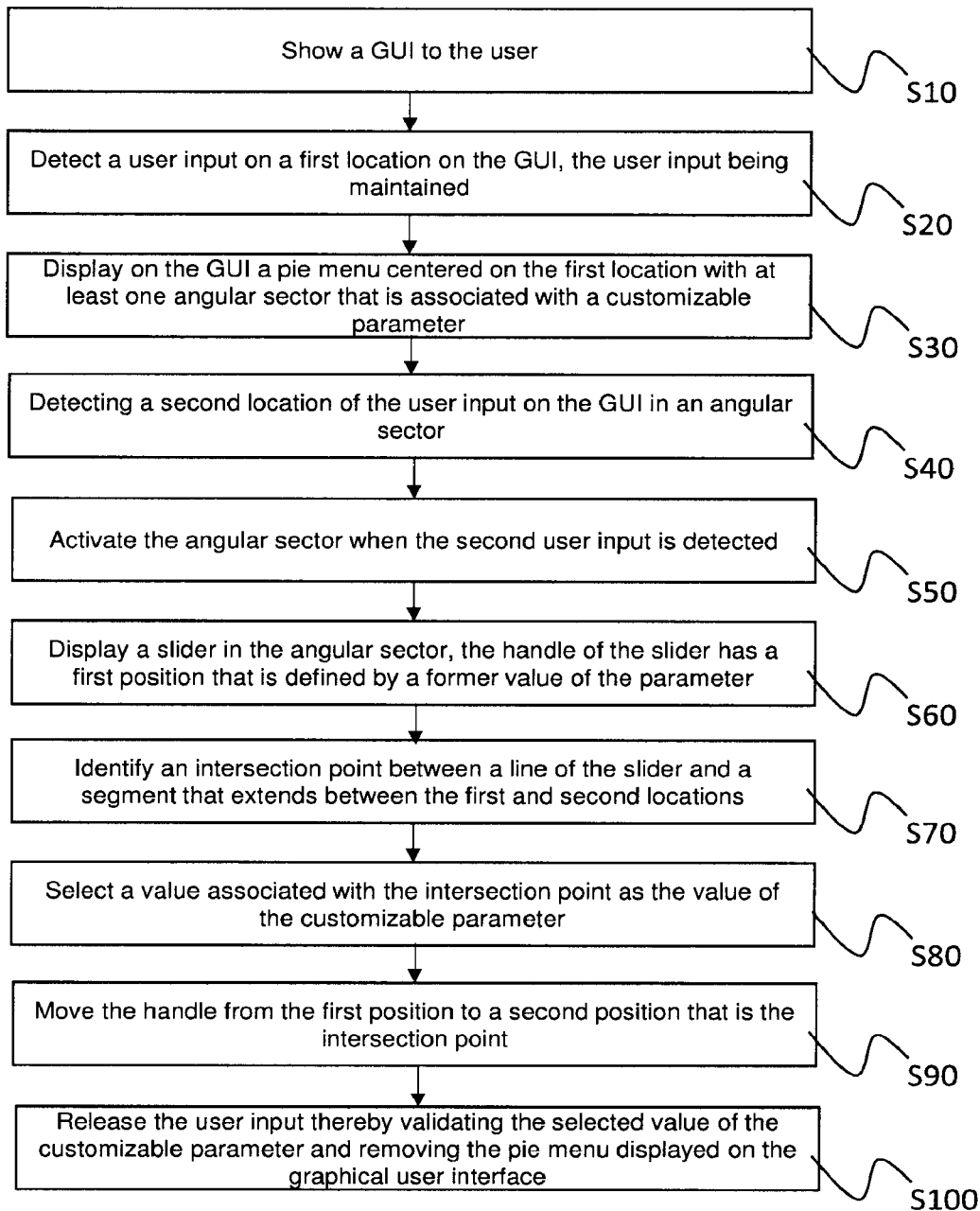
FIG. 7 is a flowchart illustrating an example of the present invention.

With reference to the flowchart of FIG. 7, it is proposed a computer-implemented method of setting a parameter with a pie menu. The method comprises the detection of a user input on a first location on a graphical user interface (GUI).

The user input is maintained. The method further comprises the display of a pie menu centered on the first location. The display of the pie menu is performed in the GUI, and is then part of the GUI once displayed. The pie menu comprises at least one angular sector that is associated with a customizable parameter. In addition, the method comprises the detection of a second location of the user input in at least angular sector of the pie menu. The second location is on the GUI. The method also comprises the selection of a value of the customizable parameter according to the second location in the GUI. The value of the parameter is selected among a set of values. Typically, the set of values forms a range of continuous values.

The method of the present invention provides an efficient solution for selecting a parameter value among a set of parameter values. Instead of associating a value with a pie slice of the pie menu, the present invention allows to associate a parameter with a pie slice, and then a value of said parameter is selected according to a location of the user input; this user input is the same as the one that previously triggered the selection of the pie slice associated with the parameter. As the selection of a parameter value is no more directly linked with the selection of a pie slice, but on the contrary with the location of the user input, the selection of one value among a set of values is possible, while preserving the advantages of the pie menu. Indeed, operations on a pie menu rely on user input trajectories for performing an operation (e.g. the selection of a pie slice), and not on a precise and accurate user action that goes against the productivity a pie menu offers. In addition, all the steps of the present invention are performed with one single user input, which therefore highly reduces the number of user actions in order to select a value in a range of values. This not only reduces the number of user actions and the distance travelled by the mouse for carrying out the selection, but it also increases the speed of the selection process. Other advantages of the present invention will be discussed in the description.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

Figure 9:
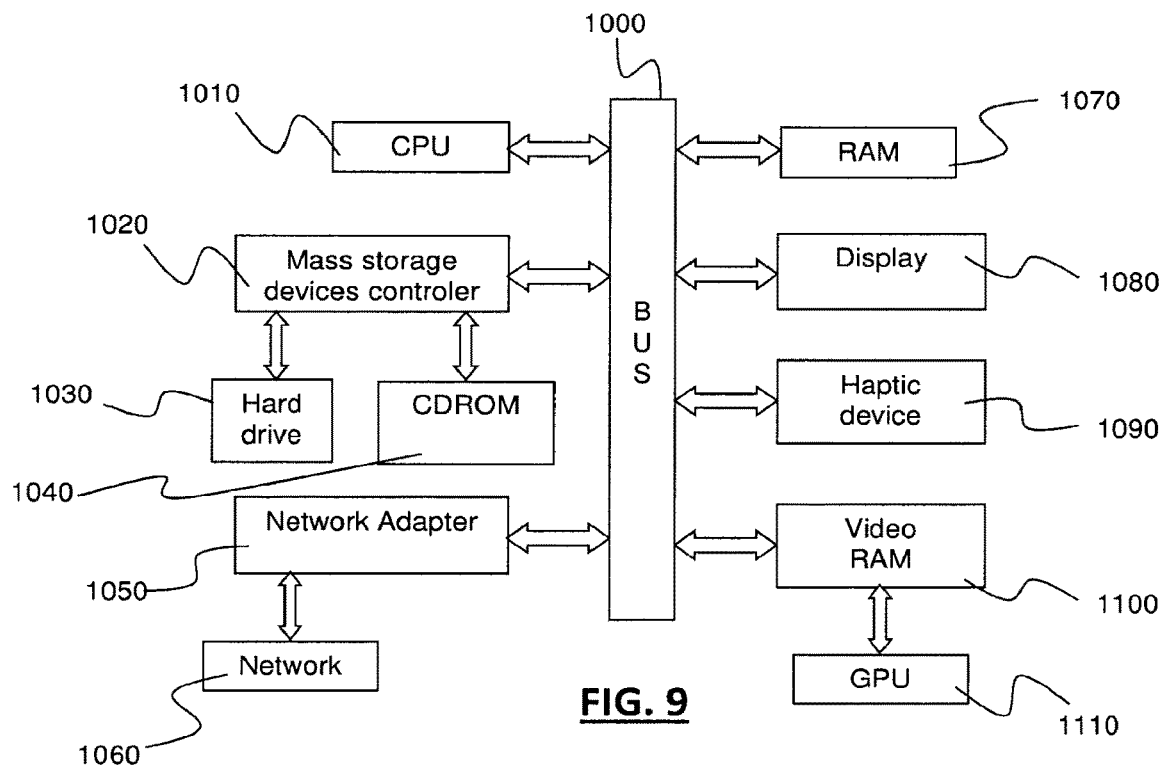
FIG. 9. shows an example of system for performing the present invention.

FIG. 9 shows an example of a system for performing the method of the invention. The system is typically a computer, e.g. a personal computer. The computer of FIG. 9 comprises a central processing unit (CPU) 1010 connected to an internal communication BUS 1000, a random access memory (RAM) 1070 also connected to the BUS. The computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The computer may also include a haptic device 1090 such as cursor control device, a keyboard or the like. A cursor control device is used in the computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the computer system may comprise a sensitive pad, and/or a sensitive screen.

The present invention can be implemented by a computer program. The computer program comprises instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring back to FIG. 7, at step S10, a graphical user interface (GUI) is shown to the user by the computer system executing the method. A GUI is an interface that allows users to interact with a computer system. The interactions are generally performed with menu and toolbars containing a set of user-selectable icons, each icon being associated with one or more operations or functions, as known in the art. A pie menu is such a toolbar. The GUI may further show various types of graphic tools; for example, a the GUI of a computer-aided design system may comprise graphic tools for facilitating 3D orientation of the object, for triggering a simulation of an operation of an edited product or rendering various attributes of the displayed product. A cursor is in general used to interact with the GUI, the cursor of the haptic device 1090. The interactions can be performed directly on a touch sensitive display that shows the GUI, e.g. an appendage such as user finger(s) or a stylus are typically used for interacting with the GUI. It is to be understood that the present invention can be carried out on any kind of GUI accepting user inputs or user interactions.

Next, at step S20, a user input is detected. The detection is carried out by the system, the input being the result of a user action. A user input is an interaction with the GUI, e.g. the user clicks on a button of the mouse, the user moves the cursor of the mouse, put a finger on the screen . . . . The detection of the user input is performed as known in the art. The location (x,y) of the user input on the display is a first location on the GUI. Importantly, the user input is maintained. This means that the system continuously receives a signal while the user action lasts. For instance, the user holds down the button on a mouse continuously; the button is not released by the user. Hence, the further steps of the methods are carried out with the user input maintained, unless specified otherwise.

Then, at step S30, a pie menu is displayed on the GUI by the computer system. This is performed as known in the art. For instance, if the GUI shows a three-dimensional (3D) scene wherein 3D (modeled) objects are located, the pie menu appears over the 3D scene, that is, the pie menu is displayed on a 2D plan wherein the scene and the objects are projected for display purpose.

The pie menu that appears on the GUI is centered on the first location. This means that one particular point of the pie menu coincides with the point representing the location of the user input.

Referring now to FIG. 1, it is shown an example of a pie menu 10 as known in the art and that can be used with the present invention. The pie menu 10 has a form of an annulus, that is, a ring-shaped object wherein a region is bounded by two concentric circles having a common center. The point 14 is the common center of these two circles, and it is also the center of the pie menu 10. The center 14 coincides with the first location defined in the GUI as a result of the user input with the cursor 18. It is to be understood that a pie menu has a radial shape that can be irregular; for instance, the pie menu may be a hexagon or any other shape having a center from which the access to the functions associated with the pie menu are substantially equidistant from said center. The pie menu may have any shape and is not limited to geometrical shapes such as the afore-mentioned hexagon. The pie menu is divided into eight pie slices or annular sectors, for instance the annular sector 16. The pie menu further comprise a disk 12 having the point 14 as center.

Back to step S30, the pie menu that appears centered on the first location comprises one or more angular sectors, each angular sector being associate with a customizable parameter.

The expression angular sector means a zone that is comprised between two half-lines sharing a common endpoint. The two half-lines form an angle that is not a reflex angle. FIG. 2 is another example of a pie menu wherein two half lines 24, 26 shares the point 14 that is the center of the pie menu. A zone 20 extends between these two half lines, the zone comprising the non-reflex angle. It is to be understood that the second zone that comprises the reflex angle can also be associated with a customizable parameter.

The expression customizable parameter means a parameter that is associated with a value, and the value belongs to a range of values. Each value of the range can be associated with the parameter, being understood that one value at a time is associated with the parameter. The range of values preferably form a set of continuous values, as opposed to discrete values. The term value is synonym of data. The range of values can be finite or infinite. For the sake of clarity, a temperature can be a customizable parameter associated to an angular sector, and a value associated to this parameter belongs to range of temperatures (e.g. 0-100 kelvins).

Still in reference to FIG. 2, the angular sector 20 comprises a pie slice 16 that is in this example a sector of the annulus. The annular sector 16 may display information regarding the parameter 21 that is associated with the angular sector (here the name of the parameter is "size") and can display the value 22 currently associated with the parameter (here the value "1").

FIG. 2 exemplifies steps S20 and S30 during which the user maintains pressed down the button of a haptic device controlling the cursor 18 and the pie menu appeared centered on the point 14 at the head of the cursor 18.

Next, at step S40, a second location of the user input is detected on the GUI and this second location is in an angular sector. In practice, this means that the user inputs moved from the first position to the second one. For instance, the user actuated on the mouse so that the cursor moved from the first to the second position, the button of the mouse being maintained down. The second location is in the angular sector; this means that the position in the GUI of this second location has coordinates (x,y) that belong to the set of coordinates in the GUI covered by the angular sector. The detection is performed as known in the art.

Referring now to FIG. 3, the step S40 is exemplified. The user moves the cursor 18 from the first location represented on FIG. 2 to a second location represented on FIG. 3, the user input being maintained. Interestingly, the detection of the second location is made possible because the user input is over the annular sector 16; by this way, no detection of the second location is made while the cursor is not over an annular sector. It is to be understood that the detection of the second location may be made possible only after that the user input has crossed the annular sector 16.

Then, at step S50, the angular sector, in which the second location of the user input has been detected, is activated by the computer system. Activating an angular sector means that the subsequent operations performed by the user or the system will concern only this angular sector. Said otherwise, the other angular sectors (if any) are ignored while the user input is maintained by the user.

Interestingly, the disk 14 shown on FIG. 1 may be a neutral area wherein no second position is detected, and thus no activation of an angular sector is carried out. This provide the user with the possibility to slightly move the cursor around the first position without triggering an undesired selection of an angular sector.

In the event the user wants to select another angular sector (that is, the user wants to select another parameter), he can moves the user input back to the neutral area 14 and restarts the identification of one of the angular sectors of the pie menu.

Next, at step S60, an object is displayed in the selected angular sector. The term object means a graphical representation of the set of values the parameter in which the value to be assigned to the parameter is selected.

This object may be a line 44, and a position on this line may be associated with a parameter value. Typically, the line 44 is part of a slider 40 that comprises said line and a handle 42. The handle can move (or slide) on the line. The display of the object (e.g. the slider 40) is carried out as a result of the activation of the angular sector 20. The slider is a graphical element with which the user can set of a value of the parameter associated with the angular sector. Traditionally, the user grabs and moves the handle in order to modify the value of the parameter. Alternatively, the user may also click on a point on the line to move the handle at this point and change the value accordingly.

The object (e.g. the slider 40) is preferably displayed at the top of the annular sector 16. Advantageously, more space is available for displaying the slider. The object may be displayed below the annular sector; in this case the representation of the slider is smaller as there is less space. The slider may be represented over the annular sector; the information represented on the sector is thus hidden by the slider, at least partially.

The line of the slider is typically an arc (an arc segment) that is displayed in the angular sector. The arc has typically the point 14 for center. It is to be understood that the handle follows this arc when the value of the parameter is modified.

The slider is displayed a the activation of the angular sector, and the position of the handle in the slider is defined by a former value of the customizable parameter. For instance, on FIG. 4, the former value of the parameter size is "1" (the former value is also the current value in this case as the value of the parameter has not been changed yet), and the handle 42 is displayed on the line 44 of the slider 40 with a position that is associated with this value "1".

Still in FIG. 4, the slider is displayed in the angular sector, which means that the graphical representation of the slider is completely or partially encompassed in the angular sector. The slider might be displayed outside the activated angular sector: indeed, the display of the slider depends on the activation of the angular sector and actions on the slider depend on the trajectory followed by the user input.

When the angular sector is activated, the graphical representation of the part of the pie menu 16 that is inside the activated angular sector may be modified in order to inform the user of the activation of the angular sector. For instance, the representation of the annular sector has been slightly changed in FIG. 4 compared to the one in FIG. 3.

Interestingly, two or more objects can be displayed at step S60; for instance the angular sector may be associated with two or more parameters. The selection of one of the objects triggers the selection of the parameter associated with it. The selection of one of the objects can be performed according a distance between the first location and the second location. For instance, two or more sliders can therefore be represented as a result of the activation of the angular sector, and the selection of a slider among the displayed sliders depends on the distance between the first and second locations. The rendering of the currently selected slider can be modified in order to indicate the user which slider is currently in use (or selected). In practice, this means that the object (e.g. a slider) with the shortest distance from the user input is selected, and that a value is selected on this object in accordance with the present invention. No value associated with the others objects is selected, even if these objects are intersected by the user input. After that a value of the first object has been selected (as a result of the intersection between the user input and said object), the user maintains the user input and he can select one of the other objects. The selection depends now on the distance between the location of the user input and the objects: the closest object is selected. Once the second object is selected, the user can select a new value, e.g. by performing the steps depicted in relation with FIG. 8. Next, once the second value of parameter is selected, the user can select a third object by moving the cursor toward this third object so that the distance between the location of the user input and the third object is the minimum distance among the distances between the location of user input and the objects. When the third object is selected, the user can select a new value the same way as for the second object. This process can be repeated until the user has selected the new parameter values he wishes. For the sake of clarity, an example is now discussed wherein the user configures three parameters of a color; three sliders are displayed in the activated angular sector. First, the user input intersects a first slider displayed in the angular sector, the first slider representing the parameter "tint" of the color. Once a tint has been selected as a result of the intersection between the user input and the slider, the user moves the user input toward a second slider that represents the "saturation" of the color. The second slider is selected as the distance between the second slider and the user input is the shortest distance. The user moves the user input in a direction substantially perpendicular to a bisection of the selected angular sector, as described below. When the user wants to select the value of the parameter "saturation", he moves the cursor toward the third slider so that the third is selected. He proceeds the same way on the third slider that represents the parameter "luminosity" of the color. Hence, three parameter values of the color are now configured. Interestingly, the user does not need to configure all the parameters; said otherwise, the user can select a parameter value for one or more sliders only, the other slider retaining their former values. For instance, after the user has selected and validated the new value for the parameter "saturation", no further value is selected and the parameter "luminosity" retains its former value (which is now its current value).

Referring back to the flowchart of FIG. 7, at step S70, the system identifies an intersection point between the object and a segment that extends between the first and second locations; one could say that the segment is linking the first and second locations. Said otherwise, the system identifies an intersection point between the object and the second location. The intersection point is associated with a value, and this value is selected as the new value that is replacing the former value of the parameter, step S80. The selection of the value thus relies on the direction of the user input on the GUI when moved from the first location. The association between a point of the object (e.g. a slider) and the intersection point is performed as known in the art.

Referring again to FIG. 4, the cursor 18 moved from the first location 14 to the second one 48, and the segment linking these two locations intersects the slider on point 46. This intersection point 46 is associated with the parameter value "4". It is reminded that the user input is still maintained.

As previously discussed in reference to FIG. 2, the annulus sector 16 may display information regarding the parameter 21 and the value 22 currently associated with the parameter. The display of the value of the parameter associated with active angular sector can be a real-time display. This means that the value displayed is the selected value. In FIG. 5, the value "4" could be associated with the parameter "size" if the cursor 18 would stay on location 52.

The handle of the slider displayed at step S60 is preferably displayed at a first position that is defined by the former value of the customizable parameter. In FIG. 4, the handle is positioned on the left of the slider and this position is associated with the parameter value "1". Then, after that the user input has intersected the object (e.g. the slider), the handle has a new position 46 that is the intersection point of the user input with the object, at step S90. This point is associated with the current parameter value "4". The position of the handle can be computed in real-time so that the handle provides the user with a visual indication of the current selectable parameter value. The handle moves in real time from the first position to second position. This can be performed together with the real time display of the value in the annulus sector.

Then, at step S100, the user input is released by the user. As a result, the value is selected by the system, and the customizable parameter is associated with this value. In addition, the pie menu is removed from the GUI as a result of said release of the user input.

In FIG. 6, the user has released the left button of the mouse, and parameter "size" has a value "4". Interestingly, the graphical representation of the part of the pie menu 16 that is inside the angular sector formerly activated has regained its original aspect, e.g. as shown in FIG. 3. Inter-estingly, the pie menu does disappear after that a period of time elapsed from the release of the user input. This allows the user to have a visual feedback of the selected value.

Figure 8:
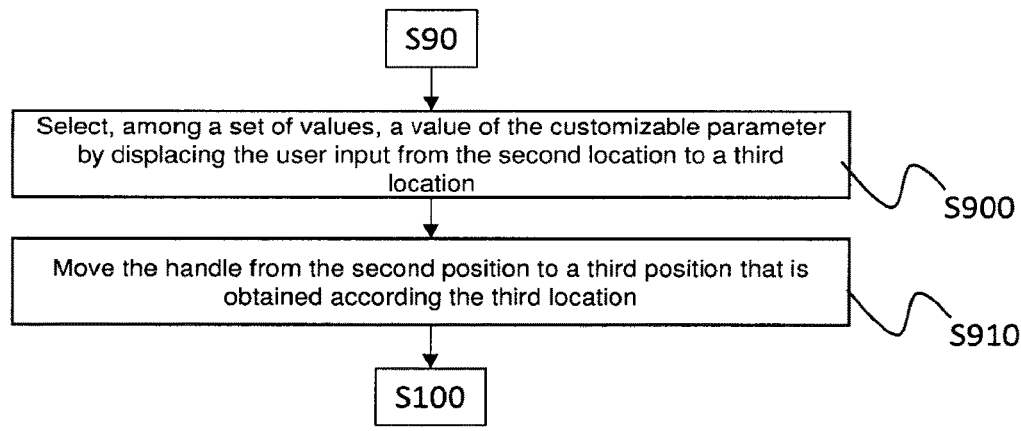
FIG. 8 is a flowchart illustrating a further example of the present invention.

Back to the step S90 on FIG. 8, the user may be not satisfied by the value selected as a result of the steps S10 to S80 of FIG. 7. Instead of releasing the user input at step S100 and starting again the steps S10 to S100, the user has the possibility to select a new value of the customizable parameter by displacing the user input from the second location to a third location (step S900, FIG. 7). It is reminded that the user input is still maintained. In practice, this displacement from the second location to the third location is substantially perpendicular to a bisection of the selected angular sector. The expression substantially perpendicular means that the segment linking the second 50 and third 52 locations has an angle with the bisection comprised between 60 degrees and 120 degrees. The third location is placed to the right of the bisection as the user wanted to increase the value of the parameter. For decreasing the value, he could move the user input to the left of the bisection. Inversely, the user might move the user input to the left of the bisection for increasing the value and to the right of the bisection for decreasing said value. It is to be understood that this is only a design choice.

The selection of a parameter value among the range of values is performed as known in the art. For instance, this selection can comprises a traversal of the range of values that are ranked. Here the term ranking means that an order exists between the values; there is a chain of values wherein each value has a position in the set of values. The number of values traversed is proportional to the distance of the displacement of the user input from the second location to the third location. The distance may be a Euclidian distance, a number of pixels . . . . The selected value is the last value met during the traversal once the third location is reached, that is, once the displacement of the user input stops. The direction for traversing the values of the set depends on the position of the third location. For instance, when the third location is placed to the right of the bisection, the chain may be traversed from the left to the right. On the contrary, when the third location is placed to the left of the bisection, the chain may be traversed from the right to the left. It is to be understood that this is only a design choice.

As previously mentioned, the customizable parameter can be already associated with a value (here called the former value) before the selection of a new value occurs. The traversal of the ranked values is performed from the former value to the left or to the right of the range of values depending on the third location.

When the last value (that is, the value of one of the two range-bounds) is reached, the traversal of the values of range stops, even if the user continues to move the user input toward the same direction.

The selection of a parameter value may be defined by the distance between the second and third locations, as depicted in FIG. 8. It can be difficult for the user to select a precise value because too many values scroll while the user inputs is displaced; this is especially the case when the range of value is large (that is, the number of selectable values is significant). The accuracy of the selection can be improved: it may further depend on the distance between the first location (the center of the pie menu) and the second location: for a same distance between the second and third locations, the number of the values that may be potentially selected is not the same. For instance, the number of ranked values traversed is proportional to the distance between the first and second locations.

Alternatively, the accuracy of the selection may further depend on the distance between the slider and the second location. The number of ranked values traversed is thus proportional to this second distance between slider and the second location.

Figure 10:
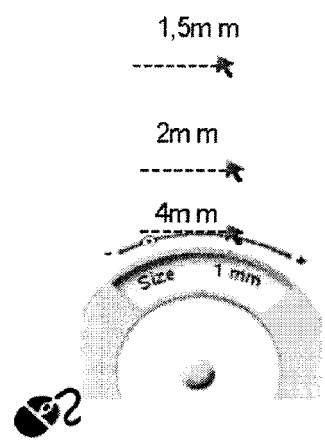
FIG. 10 shows an example of the present invention.

FIG. 10 shows an example wherein the accuracy of the selection of a value depends on the distance between the slider and the second location on which the user input has been detected. Hence, for a same distance travelled between the second and third locations, the parameter value that can be selected also depends on the distance between the first and second locations. In FIG. 10, three different parameter values are selected (for a same distance between the second and third locations of the user input) according the distance between the user input and the slider.

As already discussed, the position of the handle of the slider displayed at step S60 can be computed in real-time so that the handle provides the user with a visual indication of the current selectable parameter value. The handle may move in real time from the second position (S90) to a current position (the third one) that is determined by the third location of the user input. This can be performed together with the real time display of the value in the annular sector.

The computer program that comprises instructions for causing a computer to perform the invention can be implanted as a widget. The term widget means a graphical control element that is displayed in a GUI. The widget is thus a software component with which the user interacts. The widget comprises code means for performing the method. In particular, the widget comprises instructions for displaying pie menu displayed on the graphical user interface. The widget can comprise instructions for displaying an annulus with at least one annular sector delimited the at least one angular sector, as depicted in reference to FIGS. 1 and 2. For instance, the annular sector of the pie menu may display the selected value of the customizable parameter. As another example, the slider may be located on top or below the annulus in the at least one angular sector, that is, on top or below the annular sector in the selected angular sector.

The invention can be carried on a system as the one depicted in FIG. 9. The processor is communicatively coupled to a memory and a display device. The memory have recorded thereon instruction causing the processor to execute the invention. The display shows the GUI. The system further comprises haptic device for receiving user actions that are then transformed into user inputs. Interestingly, the invention can be implemented on a system with a touch sensitive display, e.g. a tablet.

The preferred embodiment of the present invention has been described. It will be understood that various modifications may be made without departing from the spirit and scope of the invention. Therefore, other implementations are within the scope of the following claims.

The invention claimed is:

1. A computer-implemented method of setting a parameter comprising:
   detecting a user input on a first location on a graphical user interface generated by processing circuitry of the computer, the user input being maintained;
   controlling, by the processing circuitry, display, on the graphical user interface a pie menu centered on the first location, the pie menu being a ring-shaped object having a center which is the center of the pie menu, the pie menu comprising at least two angular sectors that are adjacent to each other and that are each associated with a respective customizable parameter, wherein an angular sector is a zone that is comprised between two half-lines sharing a common endpoint that is the center of the pie menu;
   detecting a second location of the user input on the graphical user interface in at least one angular sector of the at least two angular sectors;
   controlling, by the processing circuitry, activation of the at least one angular sector after detecting the second location, other angular sectors being ignored while the user input is maintained by the user, the activation of the at least one angular sector beginning at the time of the detection of the second location, the at least one angular sector remaining continuously activated from the time of the detection of the second location and while the user input is maintained; and
   while the user input is maintained, the at least one angular sector being thereby activated, the other angular sectors being thereby ignored, detecting selection, among a set of values, of a value of the respective customizable parameter of the at least one angular sector according to the detected second location, wherein the set of values is represented by an object in the activated at least one angular sector, and wherein the selection comprises identifying an intersection point between the object and a segment that extends between the first and second locations and selecting a value associated to the intersection point as the value of the customizable parameter, wherein, while the at least one angular sector is activated, only the value of the respective customizable parameter of the activated at least one angular sector can be selected, wherein values of the respective customizable parameters of all the ignored other angular sectors cannot be selected while the at least one angular sector is activated and while the other angular sectors are ignored.

2. The computer-implemented method of claim 1, further comprising, after the activating the at least one angular sector, displaying at least one handle on the object in the at least one angular sector as a result of the activation of the angular sector; and
   further comprising after the selecting;
   positioning the at least one handle in the at least one angular sector at the intersection point.

3. The computer-implemented method of claim 2, wherein the displaying the at least one handle further comprises displaying the at least one handle at a first position that is defined by a former value of the parameter, and
   wherein the positioning the at least one handle further comprises moving the at least one handle in the at least one angular sector from the first position to the intersection point.

4. The computer-implemented method of claim 3, wherein the movement of the at least one handle from the first position to the intersection point follows the object that is a line, the at least one handle and the line forming a slider.

5. The computer-implemented method of claim 2, wherein the at least one handle is selected among a set of handles, the selection being carried out according a distance between the second location and the first location.

6. The computer-implemented method of claim 1, further comprising, after the selecting:
   selecting, among the set of values, a second value of the customizable parameter that replaces the value previously selected by displacing the user input from the second location to a third location.

7. The computer-implemented method of claim 6, wherein the selection of the second value among the set of values is performed by:
   traversing ranked values of the set from the previously selected value of the parameter, the number of ranked values traversed being proportional to a distance of the displacement of the user input from the second location to the third location; and
   selecting, as the value of the customizable parameter, the last value met during the traversal when the third location is reached.

8. The computer-implemented method of claim 7, wherein the set of values is represented by an object in the at least one angular sector, wherein the selecting further comprises:
   identifying an intersection point between the object and a segment that extends between the first and second locations; and
   selecting a value associated to the intersection point as the value of the customizable parameter;
   further comprising, after the detecting the second location;
   displaying at least one handle on the object in the at least one angular sector as a result of the activation of the angular sector;
   further comprising after the selecting;
   positioning the at least one handle in the at least one angular sector at the intersection point,
   wherein the at least one handle is selected among a set of handles, the selection being carried out according a distance between the second location and the first location; and
   further comprising positioning the at least one handle according to the selected second value by moving the at least one handle from the intersection point to a second position that is obtained according to the third location.

9. The computer-implemented method of claim 6, wherein the displacement from the second location to a third location is substantially perpendicular to a bisection of the at least one angular sector.

10. The computer-implemented method of claim 7, wherein the number of ranked values traversed is further proportional to a second distance between the second location and the first location.

11. The computer-implemented method of claim 1, further comprising:
   displaying in real time the value currently met while traversing the ranked values.

12. The computer-implemented method of claim 1, further comprising:
   releasing the user input thereby validating the selected value of the customizable parameter and removing the pie menu displayed on the graphical user interface.

13. A non-transitory computer readable medium storing thereon a widget comprising code for performing a computer-implemented method of setting a parameter comprising:
   detecting a user input on a first location on a graphical user interface generated by processing circuitry of the computer, the user input being maintained;
   controlling, by the processing circuitry, display, on the graphical user interface a pie menu centered on the first location, the pie menu being a ring-shaped object having a center which is the center of the pie menu, the pie menu comprising at least two angular sectors that are adjacent to each other and the pie menu comprising at least two angular sectors that are each associated with a respective customizable parameter, wherein an angular sector is a zone that is comprised between two half-lines sharing a common endpoint that is the center of the pie menu;
   detecting a second location of the user input on the graphical user interface in at least one angular sector of the at least two angular sectors;
   controlling, by the processing circuitry, activation of the at least one angular sector after detecting the second location, other angular sectors being ignored while the user input is maintained by the user, the activation of the at least one angular sector be inning at the time of the detection of the second location, the at least one angular sector remaining continuously activated from the time of the detection of the second location and while the user input is maintained; and
   while the user input is maintained, the at least one angular sector being thereby activated, the other angular sectors being thereby ignored, detecting selection, among a set of values, of a value of the respective customizable parameter of the at least one angular sector according to the detected second location, wherein the set of values is represented by an object in the activated at least one angular sector, and wherein the selection comprises identifying an intersection point between the object and a segment that extends between the first and second locations and selectin a value associated to the intersection point as the value of the customizable parameter, wherein, while the at least one angular sector is activated, only the value of the respective customizable parameter of the activated at least one angular sector can be selected, wherein values of the respective customizable parameters of all the ignored other annular sectors cannot be selected while the at least one angular sector is activated and while the other angular sectors are ignored.

14. A system comprising processing circuitry of a computer communicatively coupled to a memory and a graphical user interface, the memory having recorded thereon instructions causing the processing circuitry to be configured to
   detect a user input on a first location on a graphical user interface generated by the processing circuitry of the computer, the user input being maintained;
   control, by the processing circuitry, display, on the graphical user interface, of a pie menu centered on the first location, the pie menu being a ring-shaped object having a center which is the center of the pie menu, the pie menu comprising at least two angular sectors that are adjacent to each other and that are each associated with a respective customizable parameter, wherein an angular sector is a zone that is comprised between two half-lines sharing a common endpoint that is the center of the pie menu;
   detect a second location of the user input on the graphical user interface in at least one angular sector of the at least two angular sectors;
   control, by the processing circuitry, activation of the at least one angular sector after detecting the second location, other angular sectors being ignored while the user input is maintained by the user, the activation of the at least one angular sector beginning at the time of the detection of the second location, the at least one annular sector remaining continuously activated from the time of the detection of the second location and while the user input is maintained; and while the user input is maintained, the at least one angular sector being thereby activated, the other angular sectors being thereby ignored, detect selection, among a set of values, of a value of the respective customizable parameter of the at least one angular sector according to the detected second location, wherein the set of values is represented by an object in the activated at least one angular sector, and wherein the selection comprises identifying an intersection point between the object and a segment that extends between the first and second locations and selecting a value associated to the intersection point as the value of the customizable parameter, wherein, while the at least one angular sector is activated, only the value of the respective customizable parameter of the activated at least one angular sector can be selected, wherein values of the respective customizable parameters of all the ignored other angular sectors cannot be selected while the at least one angular sector is activated and while the other angular sectors are ignored.

* * * * *